(12) United States Patent
Kaufman et al.

(10) Patent No.: US 10,252,367 B2
(45) Date of Patent: Apr. 9, 2019

(54) METHOD AND SYSTEM OF WELDING WITH AUTO-DETERMINED STARTUP PARAMETERS

(71) Applicant: ILLINOIS TOOL WORKS INC., Glenview, IL (US)

(72) Inventors: Charles L. Kaufman, Appleton, WI (US); Michael Todd Klegin, Greenville, WI (US); Chris J. Roehl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/457,434

(22) Filed: Mar. 13, 2017

(65) Prior Publication Data

US 2017/0182581 A1    Jun. 29, 2017

Related U.S. Application Data

(63) Continuation of application No. 14/189,659, filed on Feb. 25, 2014, now Pat. No. 9,604,303, which is a continuation of application No. 11/013,624, filed on Dec. 16, 2004, now Pat. No. 8,658,942.

(51) Int. Cl.
| | |
|---|---|
| *B23K 9/09* | (2006.01) |
| *B23K 9/12* | (2006.01) |
| *B23K 9/095* | (2006.01) |
| *B23K 9/10* | (2006.01) |
| *B23K 103/10* | (2006.01) |

(52) U.S. Cl.
CPC ............... *B23K 9/125* (2013.01); *B23K 9/09* (2013.01); *B23K 9/0953* (2013.01); *B23K 9/10* (2013.01); *B23K 2103/10* (2018.08)

(58) Field of Classification Search
CPC ........ B23K 9/125; B23K 9/09; B23K 9/0953; B23K 9/10; B23K 9/073; B23K 2203/10
See application file for complete search history.

(56) References Cited

U.S. PATENT DOCUMENTS

| | | | | |
|---|---|---|---|---|
| 4,973,821 A | * | 11/1990 | Martin ................. | B23K 9/1062 219/130.51 |
| 5,059,765 A | * | 10/1991 | Laing ...................... | B23K 9/12 219/125.11 |
| 6,531,684 B2 | * | 3/2003 | Rice ....................... | B23K 9/073 219/130.21 |
| 2004/0226924 A1 | * | 11/2004 | Wessner ............. | B23K 26/1429 219/121.66 |

\* cited by examiner

*Primary Examiner* — Brian W Jennison
(74) *Attorney, Agent, or Firm* — McAndrews, Held & Malloy, Ltd.

(57) ABSTRACT

A method and system to determine optimum operating parameters for the startup phase of a welding-type process based on user-desired operating parameters of the post-startup or welding phase of the welding-type process are disclosed. While applicable to a number of welding-type processes, the method and system are particularly configured to determine an optimum wire feed speed for Gas Metal Arc Welding of aluminum using pulse spray transfer.

20 Claims, 6 Drawing Sheets

METHOD AND SYSTEM OF WELDING WITH AUTO-DETERMINED STARTUP PARAMETERS

CROSS-REFERENCE TO RELATED APPLICATIONS

This application is a continuation of U.S. patent application Ser. No. 14/189,659, filed Feb. 25, 2014, entitled "Method and System of Welding with Auto-Determined Startup Parameters" in the name of Charles L. Kaufman et al., which is a continuation of U.S. patent application Ser. No. 11/013,624, filed Dec. 16, 2004, entitled "Method and System of Welding with Auto-Determined Startup Parameters" in the name of Charles L. Kaufman et al., which issued as U.S. Pat. No. 8,658,942 on Feb. 25, 2014, both of which are incorporated herein by reference in their entireties for all purposes.

BACKGROUND OF THE INVENTION

The present invention is directed to welding and, more particularly, to a method and system of aluminum welding without preheating of a workpiece. The invention is particularly applicable with pulsed spray transfer welding.

Gas Metal Arc Welding (GMAW), also referred to Metal Inert Gas (MIG) welding, combines the techniques and advantages of Tungsten Inert Gas (TIG) welding's inert gas shielding with a continuous, consumable wire electrode that is delivered to a weld by a wire feeder. An electrical arc is created between the continuous, consumable wire electrode and the workpiece. As such, the consumable wire functions as the electrode in the weld circuit as well as the source of filler metal. Gas Metal Arc Welding is a relatively simple process that allows an operator to concentrate on arc control. Gas Metal Arc Welding may be used to weld most commercial metals and alloys including steel, aluminum, and stainless steel. Moreover, the travel speed and the deposition rates in GMAW may be much higher than those typically associated with either Gas Tungsten Arc Welding (GTAW), also referred to as TIG welding, or Shielded Metal Arc Welding (SMAW), also referred to as stick welding, thereby making GMAW an efficient welding process. Additionally, by continuously feeding the consumable wire to the weld, electrode changing is minimized and as such, weld effects caused by interruptions in the welding process are reduced. The GMAW process also produces very little or no slag, the arc and weld pool are clearly visible during welding, and post-weld clean-up is typically minimized. Another advantage of GMAW welding is that it can be done in most positions which can be an asset for manufacturing and repair work where vertical or overhead welding may be required.

Gas Metal Arc Welding can be carried using a number of different transfer modes, such as short circuit transfer, globular transfer, spray transfer, and pulse spray transfer. While each transfer mode may be advantageous for a given application, GMAW using pulse spray transfer (GMAW-P) is particularly advantageous for aluminum welding. Specifically, GMAW-P produces relatively little spatter and may be carried in a number of welding positions. Moreover, by adjusting peak amperage, background amperage, pulse width, pulses per second, and other variables, an operator can adaptively control the GMAW-P process to fit a given application that may not be possible with short circuit transfer, globular transfer, or spray transfer.

As referenced above, GMAW-P is often a preferred welding technique for aluminum welding. A drawback of GMAW-P with aluminum, however, is that customarily the workpiece to be weld must be preheated. Without preheating of the workpiece, it is not uncommon for a "rope-y" weld bead that lays across the weld joint to be formed. This undesirable weld joint is a result of the heat at the weld during start-up of the welding process being insufficient to melt the aluminum electrode and the workpiece into a molten pool. That is, while aluminum has a relatively low melting point, aluminum also has a relatively low resistivity. As a result, when current passes through the aluminum electrode upon formation of an arc between the electrode and the workpiece, relatively little heat when compared to steel is generated. This lack of heat generation must be compensated for to avoid the "rope-y" weld joint referenced above. Generally, the workpiece is preheated such that the preheated temperature coupled with the heat generated at the weld is sufficient to properly melt the electrode and workpiece into a molten pool such that an integrated and structurally sound joint is formed with the workpiece. As can be appreciated, preheating adds to the time, cost, and complexity of the GMAW-P with aluminum process.

One proposed solution to preheating the workpiece when aluminum welding is arbitrarily increasing the power output of the power source during startup of the welding process. In this regard, more power is initially available at the weld resulting in greater heat production. This additional heat is sufficient to create a molten pool of consumable and workpiece for sound weld joint. Moreover, the startup weld pool generates enough heat to sufficiently heat the workpiece such that once power levels are reduced to post-startup levels; the workpiece is heated to a temperature that allows the workpiece to melt during welding in a conventional manner. Thus, after expiration of startup, the power source immediately returns to operate according to user-defined settings.

A drawback of this solution is that the initial or startup power levels are pre-set and thus independent of the user-defined parameters of the welding process. For example, the proposed solution ignores the user-desired weld wire feed speed when setting the startup wire feed speed. That is, in this example, the startup wire feed speed is independent and not proportional to the user-identified and desired weld wire feed speed. This independence of wire feed speed also extends to other operating parameters of the welding process including peak amperage, background amperage, pulse width, pulse frequency, arc length, and the like. As a result, the abrupt changeover from the startup operating parameters to the post-startup parameters can negatively affect the quality of the weld. Moreover, since the desired user parameters are not considered, the preset startup operating parameters may not be optimum for the given application. For example, the startup parameters may ignore the gauge of the aluminum wire feed.

It would therefore be desirable to have a method and system of aluminum GMAW-P that does not require preheating of a workpiece and considers user-desired weld operating parameters when auto-determining optimum startup operating parameters.

BRIEF DESCRIPTION OF THE INVENTION

The present invention is directed to a method and system of automatically determining optimum startup operating parameters for a GMAW-P process that overcomes the aforementioned drawbacks.

A welding-type system is disclosed and includes a controller configured to determine optimum operating parameters for the startup phase of a welding-type process based on user-desired operating parameters of the post-startup or welding phase of the welding-type process. While applicable to a number of welding-type processes, the controller is particularly configured to determine an optimum wire feed speed for GMAW-P of aluminum. In this regard, an optimum startup wire feed speed as well as other operating parameters are determined based on and proportional to a user-desired post-startup wire feed speed such that preheating of a workpiece is not required for aluminum welding. The controller controls operation of the welding-type system such that during the startup phase of the welding process more power is available at the weld than after the startup phase.

Therefore, in accordance with one aspect of the present invention, a welding-type device having a controller is provided. The controller is configured to receive an input value for a welding-type parameter, the welding-type parameter designed to establish an operational welding-type process, and determine an offset value of the input value for the welding-type parameter. The offset value is designed to establish an operation of the welding-type process during a startup period of the welding-type process. The controller is also configured to enable user selection between the input value and the offset value for the welding-type parameter during the startup period of the welding-type process.

In accordance with another aspect, the present invention includes a method of fusing aluminum to a workpiece. The method includes the steps of receiving an input for desired weld wire feed speed and determining an optimum startup wire feed speed from the desired weld wire feed speed. The method further includes initiating the welding process at the optimum wire feed speed for a startup time period and then continuing the welding process at the desired weld wire feed speed after expiration of the startup time period.

According to another aspect, the present invention includes a controller for a welding-type system. The controller is configured to determine a first set of operating parameters designed to govern a welding-type process after an initialization period and determine a second set of operating parameters designed to govern the welding-type process during the initialization period based on the first set of operating parameters. The controller is further configured to carry out the welding-type process such that the second set of operating parameters governs the welding-type process during the initialization period and the first set of operating parameters governs the welding-type process after the initialization period.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
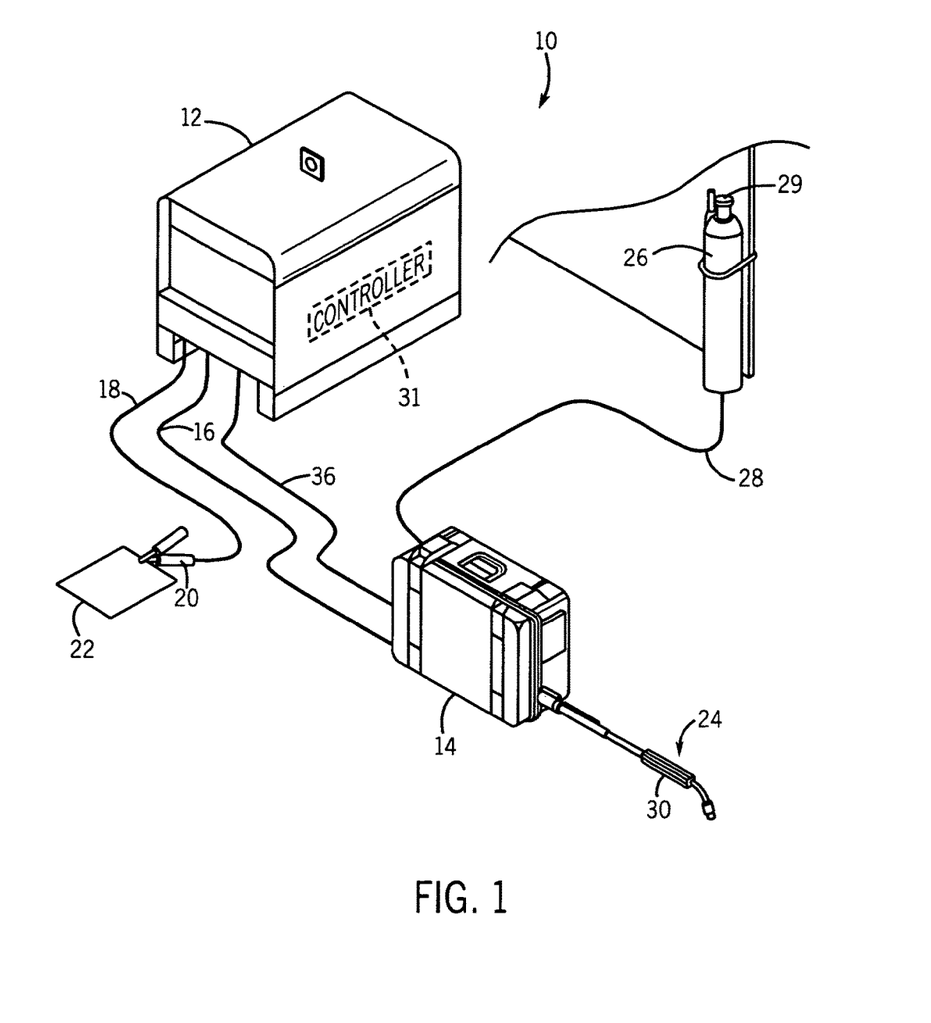
FIG. 1 is a perspective view of a GMAW system applicable with the present invention.
Figure 2:
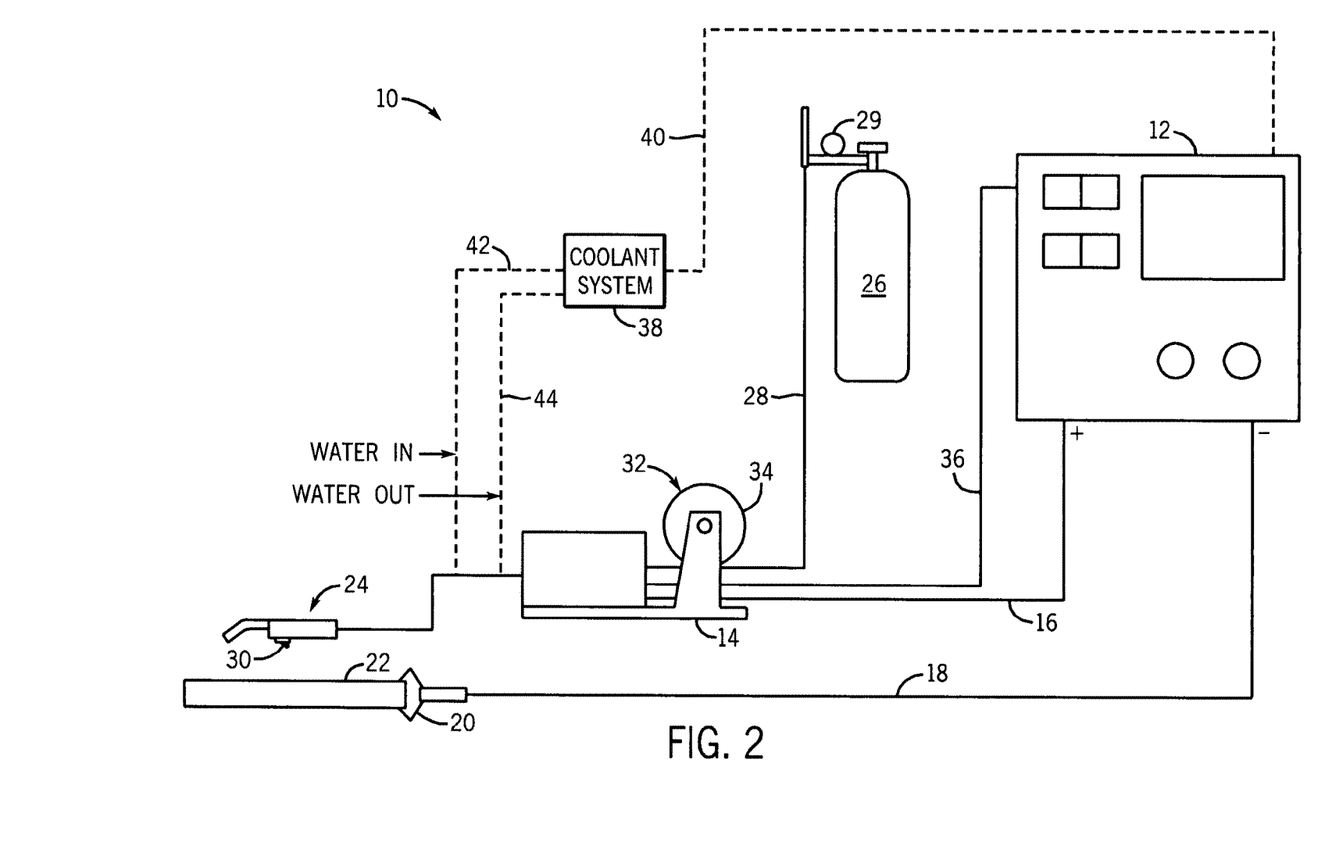
FIG. 2 is a schematic representation of an exemplary GMAW system.

Referring to FIGS. 1-2, a GMAW welding system 10 includes a welding power source 12 designed to supply power to a wire feeder 14 through a weld cable 16. The power source is designed to run in one of a number of modes including constant voltage (CV) and constant current (CC). Also connected to the power source is a secondary work weld cable 18 that connects the power source to a clamp 20 designed to connect cable 18 to workpiece 22. Also connected to wire feeder 14 is a welding gun or torch 24 configured to supply consumable welding wire to a weld. Welding system 10 may further include a gas cylinder 26 connected to wire feeder 14 such that shielding gas can be provided through gas hose 28 for the GMAW welding process. It is contemplated that the gas cylinder may be mounted to or in either power source 12 or wire feeder 14. The gas cylinder preferably includes a regulator/flowmeter 29 to regulate the delivery of gas from cylinder 26 through gas hose 28.

Power source 12 is designed to condition raw power supplied from a utility line or engine driven power supply and output power usable by the welding process. As such, power source 12 includes one or more transformer assemblies or power conditioners (not shown) to condition the raw power into a usable form for welding. The output of the power source is generally controlled by a controller 31 and associated operational circuitry that regulates the secondary or output side of the power conditioning components. This secondary output is then translated across the weld cable 16 to create a voltage potential between workpiece 22 and an electrode. Torch 24 is equipped with a pushbutton trigger 30 that when depressed causes a contactor (not shown) of the wire feeder to close and make a welding voltage available to the torch. During welding, wire feeder 14 feeds consumable wire 32 from a wire spool 34 to gun 24. The speed at which the wire feeder delivers wire to the weld is controlled by operating parameters either input by a user or automatically determined by controller 31. These control commands are transmitted to the wire feeder 14 from the power source 12 across control cable 36.

Optionally, the GMAW system may include a coolant system 38 controlled and powered by power source 12 via power cord 40 to pass coolant through the welding torch 24 through a coolant circuit 42, 44. One skilled in the art will appreciate that the coolant system includes a coolant reservoir (not shown) and a pump assembly (not shown) to regulate the flow of coolant. The coolant system 38 is designed to pass coolant to the gun torch 24 to prevent overheating of the gun torch 24.

The GMAW system includes a controller, associated circuitry, and a computer readable storage medium having software, data maps, and the like stored thereon. As will be described in greater detail below, the controller is designed to read desired welding inputs from an operator and, based on those inputs, determine optimum startup operating parameters for a given welding process. The controller determines the optimum startup operating parameters as a function of the desired weld or post-startup operating parameters input by the operator. In this regard, controller executes a technique that determines startup parameters for a given welding process that are tailored to the weld parameters identified by the operator during setup of the welding process. Moreover, the controller displays or otherwise conveys the optimum startup parameters to an operator and allows the operator to override or adjust the auto-determined optimum startup parameters, if desired. In this regard, the controller advises the operator of optimum startup parameters based on operator-desired weld or post-startup parameters, but, ultimately, enables the operator to establish the startup operating parameters. Accordingly, the GMAW system remains flexible and responsive.

Figure 3:
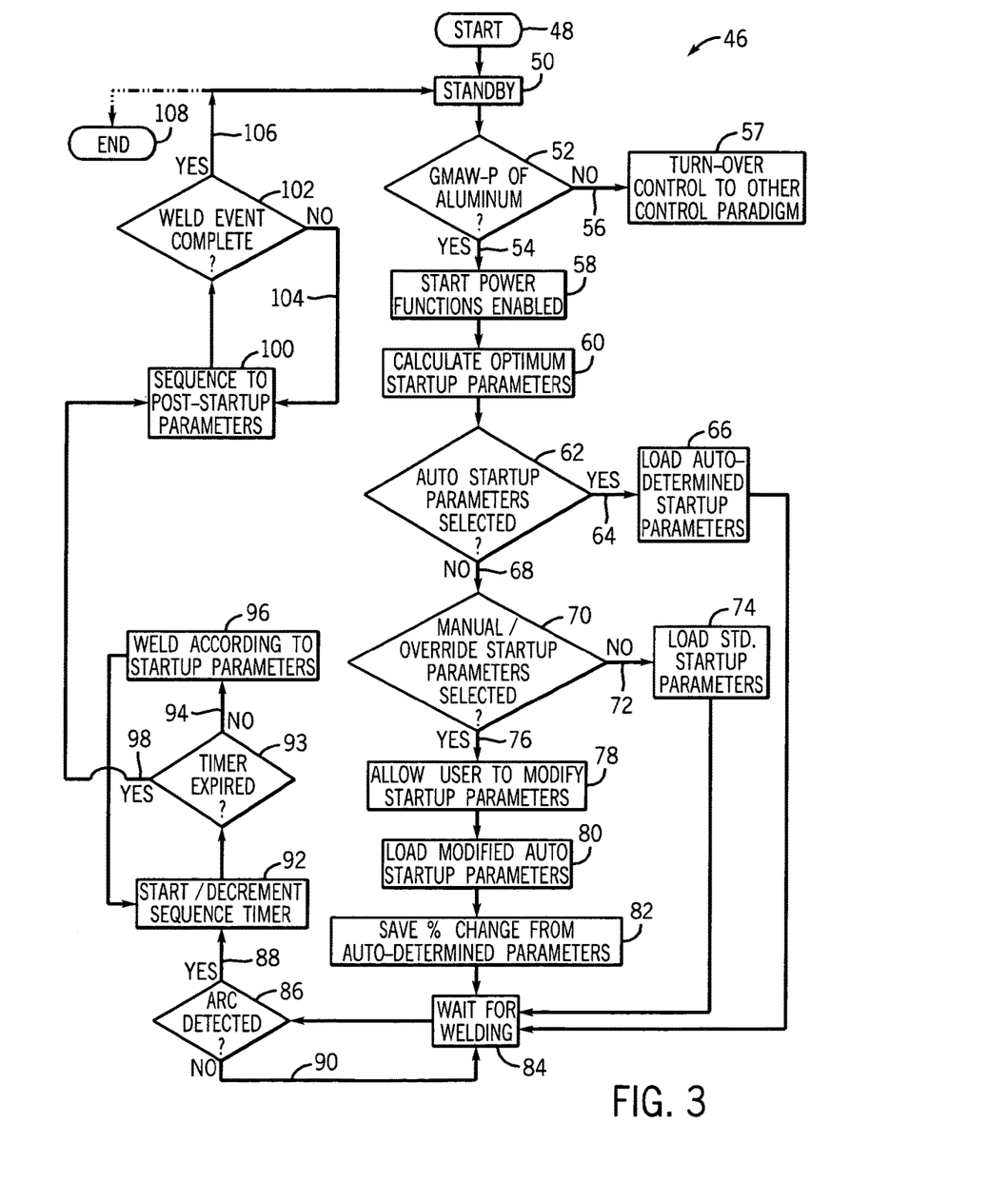
FIG. 3 is a flow chart setting forth the steps of determining operating parameters for startup and post-startup phases of a GMAW-P process for welding with an aluminum consumable.

Referring now to FIG. 3, the steps of a technique carried out by the GMAW system controller for determining optimum startup parameters of a welding process based on user-desired post-startup operating parameters are set forth. Technique 46, which is preferably carried out as a set of executable instructions stored on computer readable storage medium in the GMAW system, begins at 48 with powering up of the power source and wire feeder in a conventional manner. Once powered, the controller, in a known manner, controls the welding system into a standby mode 50. In standby, the controller reads a series of inputs from a control panel of the power source, wire feeder, or both, setting forth parameters of the welding process. The series of inputs may be entered on a control panel of the power source, the wire feeder, the welding torch, or a combination thereof. The inputs may include values for desired weld wire feed speed, type of welding process, indication of the type and/or gauge of consumable wire, voltage and current levels, and the like.

In one preferred embodiment, the present invention is particularly applicable with determining optimum startup parameters for a GMAW-P process for aluminum welding. In this regard, the controller determines at 52 whether the operator has selected or entered parameters consistent with GMAW-P of aluminum. If so 52, 54, the controller, as will be described, carries out a set of instructions to determine optimum startup parameters for a GMAW-P of aluminum process given the desired weld parameters also input by the operator. If not 52, 56, the controller transfers control of the welding process to a different control paradigm 57 designed to regulate operation of the welding system when GMAW-P of aluminum is not the welding process to be carried out. One skilled in the art will appreciate that the GMAW system is capable of carrying out a number of welding processes with several transfer modes and various types of consumable material and, as such, may include several control programs, algorithms, and the like to regulate operation of the GMAW system. As such, the controller preferably preliminarily determines what type of welding process has been defined by the operator when establishing the parameters of the welding process.

If a GMAW-P of aluminum is the defined welding process 52, 54, the controller enables a number of start power functions at 58 that will be used to determine optimum startup power parameters for the given welding process. In particular, the controller executes a number of algorithms at 60 to calculate or otherwise determine optimum startup parameters based on the user-defined weld or post-startup parameters entered at 50. As will be described in greater detail below, in one preferred embodiment, the optimum startup parameters are determined at 60 from the desired weld wire feed speed input by the operator when establishing the parameters of the welding process at 50. From the desired weld wire feed speed, the controller will determine, from a data map (look-up table) or in real-time, an optimum startup time length, startup wire feed speed, startup arc length, a ramping time and ramping arc length, maximum wire feed speed, and maximum start power. As will be described more fully, the controller controls operation of the power source and wire feeder such that there is gradual ramping from the startup operating parameters to the desired and user-defined weld parameters. In this regard, the startup period includes a constant phase and a ramping phase. In one embodiment, the constant phase is set to 0.5 seconds and the ramping phase is set to 1.0 seconds. As such, the user-defined weld parameters will not define the welding process until 1.5 seconds after an arc has been struck between the electrode and workpiece.

While the controller automatically determines optimum startup parameters for the welding process, the controller enables a user to accept or reject those auto-determined startup parameters 62. If the operator accepts the auto-determined parameters 62, 64, the auto-determined parameters are loaded 66 and will be used to define operation of the power source and wire feeder during startup of the welding process. On the other hand, if the user does not accept the auto-determined parameters 62, 68, the controller allows the user to adjust the auto-determined optimum parameters to levels that are desired 70. If the operator rejects the auto-determined optimum startup parameters 68 and declines to manually adjust the auto-determined optimum startup parameters 72, standard startup parameters are loaded 74 and will be used to govern operation of the startup portion of the welding process notwithstanding that the standard parameters may not be optimum for the given welding process.

Conversely, if the user desires to manually adjust the auto-determined optimum startup parameters 76, the controller allows the user to do so at 78. The user may manually adjust one or more of the auto-determined optimum parameters, such as optimum startup wire feed speed, optimum startup power, or optimum startup ramp characteristics. One skilled in the art will appreciate that the controller will not allow the user to adjust the startup parameters to levels not supported by the power source or wire feeder. For instance, the wire feeder supports a maximum wire feed speed and the controller will not allow the user to define a desired startup wire feed speed greater than the maximum supported by the system.

It is contemplated that the manual adjustments may be made by the user directly on the user panel(s) in which the weld or post-startup parameters were input. Moreover, it is contemplated that the controller may effectuate manual change of the optimum startup parameters in a number of fashions. For example, the user may identify a desired startup parameter by entering the desired parameter directly or as a percentage of the auto-determined parameter. For instance, the auto-determined optimum startup wire feed speed may be 180 inches per minute (ipm), but the user may desire a faster startup wire feed speed. As such, the user may directly input a desired startup wire feed speed value, e.g. 190 ipm, or enter a percentage change, e.g. 5%, to indicate a desired startup wire feed speed.

The manually adjusted startup parameters are then loaded 80 and will be used to define startup operation of the power source and wire feeder during initialization of the welding process. Moreover, it is preferred that the manual adjustments entered by the user be stored 82 on volatile memory of the welding system such that the parameters may be quickly and accurately recalled for subsequent use if desired by the user. That is, the controller may allow a user to select from one or more stored startup paradigms when defining parameters of the welding process.

When the startup parameters are loaded, whether the auto-determined optimum parameters 66, default or standard startup parameters 74, or manually adjusted startup parameters 80, the controller continues to a wait_for_welding state 84. In this state 84, the power source and wire feeder have been set to operate according to the startup parameters and the post-startup parameters that have been loaded and stored. Accordingly, in the wait_for_welding state 84, the voltage output of the power source is set to a level consistent with the loaded startup parameters. In this regard, when an arc is struck and detected by the controller 86, 88, the startup phase of the welding process will commence and commence according to the startup parameters defined for the welding process. In this regard, the controller will not initiate the startup portion of the welding process until the arc is detected 86, 88. An arc may be detected in a number of manners including, but not limited to the detection of current flow through the weld circuit. Until an arc is detected or other indicator signaling that welding has been initiated 86, 90, the controller will remain in the wait-for-welding state 84.

Once an arc has been detected, the controller will carry out the just-initiated welding process according to the loaded startup parameters 92. Further, the controller will also begin to decrement a timer and determine if the start power sequence timer has expired 93. In one preferred embodiment, the start power sequence timer decrements from 1.5 seconds. As such, the startup operating parameters will govern operation of the power source and wire feeder for 1.5 seconds. In one preferred embodiment, the first 0.5 seconds defines a constant phase and the remaining 1.0 seconds defines a ramping period. During the ramping period, the controller will gradually ramp from the parameter values that define startup mode of operation to the parameter values that define the weld or post-startup mode of operation. Accordingly, if the start power sequence timer has not expired 92, 94, the welding process is initiated at 96 using the startup parameters loaded at 66, 74, or 80. Thereafter, the controller returns to determine if the decrementing start power sequence timer has expired. Once the timer has expired 92, 98, the controller sequences to the weld or post-startup parameters defined by the user when setting up the welding process 100. The controller will then control operation of the power source, wire feeder, and other welding system components until the weld event has been completed, e.g. arc extinguished, 102. In this regard, the parameters entered by the user at step 50 will govern operation of the welding system until the arc is extinguished 102, 104. Once the welding event is terminated 102, 106, technique 46 is complete and the welding system is returned to the standby state 50 for subsequent use or powering down 108.

It is contemplated that two timers be used to define the startup period—one timer to count down the constant phase and another timer to count down the ramping phase. It is also contemplated that the determination of startup parameters can be determined after completion of each welding event or with each user establishment of a welding session. Moreover, it is preferred that the loaded startup parameters be used to control subsequent operation of the welding system at subsequent welding startup provided that the specifics of the subsequent welding operation have not varied from the previous welding operation. However, if a user adjusts a weld parameter for the subsequent welding session, it is preferred that new optimum startup parameters be determined and the acts of technique 46 be repeated.

As described above, the welding controller is designed to determine optimum startup parameters for a GMAW-P welding session based on desired weld parameters input by a user or operator. These auto-determined startup parameters are determined such that preheating of the workpiece as is customary for GMAW-P of aluminum is avoided. In one preferred embodiment, the startup parameter are determined based on the weld wire feed speed input by the user when setting up the GMAW-P of aluminum process. It is contemplated however that startup parameters can be determined from other user inputs independent or in addition to weld wire feed speed.

Weld wire feed speed is often a parameter used by welding system controllers to set other operating parameters. By basing operation based on weld wire speed, the operator need not recall and input other parameters such as voltage, current, arc length, duty cycle, and the like. In this regard, the complexity of establishing the parameters of a welding session is reduced. Moreover, by calibrating voltage, current, arc length, duty cycle and other parameters based on the user-input wire feed speed, these other parameters are set to values consistent with the desired wire feed speed. For example, if an operator inputs a desired weld wire feed speed and prompted to select a voltage level as well, the operator may select a voltage level that cannot be supported by the power source and wire feeder to deliver wire at the speed desired. As such, for some welding systems, weld parameters are determined relative to a desired weld wire feed speed.

The present invention, in one embodiment, takes advantage of this interrelationship between weld parameters and desired weld wire feed speed. Moreover, the present invention extends this interrelationship to determining optimum startup parameters. That is, in a preferred embodiment, the system controller, as will be described, determines an optimum startup wire feed speed based on a user-desired weld wire feed speed and further automatically determines values for other startup parameters based on the determined optimum startup wire feed speed. Accordingly, startup voltage, current, arc length, duty cycle, and the like will also be optimum and related to the determined optimum startup wire feed speed.

Referring now to FIG. 3, a graph illustrates an optimum startup wire feed speed curve 110 relative to a weld wire feed speed curve 112 and a maximum support wire feed speed curve 114 that have been empirically determined for GMAW-P of 0.035 Aluminum 4043. Curves 110-114 define a plurality of taught points that can be used to determine directly or through interpolation an optimum wire feed speed and other optimum startup parameters. For example, as shown in the exemplary graph, for a user-desired weld wire feed speed of 130 ipm, the optimum startup wire feed speed for 0.035 Aluminum 4043 has been found to be 180 ipm. Conversely, for weld wire feed speed of 520 ipm, the optimum startup wire feed speed for the same gauge and type of aluminum wire has been found to be 666 ipm.

As shown in FIG. 3, the optimal wire feed speed determined for a given weld wire feed speed is faster than the given weld wire feed speed. This increase in wire feed speed at startup also corresponds to increase power at the weld during the startup phase of the welding process. It has been shown that this increase in power is sufficient to heat the workpiece at welding startup such that a structurally sound and integrally formed bond is formed without the customary workpiece preheating.

FIG. 3 also shows an exemplary maximum support wire feed speed curve. As referenced above, the present invention allows a user to adjust the auto-determined optimum startup wire feed speed to a value not exceeding the maximum wire feed speed supported by the system. An exemplary maximum curve 114 is thus shown. In the illustrated example, the maximum supported wire feed speed is 800 ipm.

The values represented in the graph of FIG. 3 are preferably stored in a look-up table or data map that can be accessed to determine optimum startup wire feed speed for a given weld wire feed speed. Additionally, it also preferred that other optimum settings be stored in addition to wire feed speed to determine optimum startup parameters. Table 1 sets forth optimum settings empirically determined for 0.035 Aluminum 4043. The illustrated settings assume a startup time of 1.5 seconds, 0.5 seconds corresponding to a constant phase and the last 1.0 seconds corresponding to a ramp time. The settings include values for startup power as a function of weld power, startup art length, startup ramp arc length, startup wire feed speed, maximum wire feed speed, and maximum startup power adjustment as a percentage of weld power.

TABLE 1

0.035 Aluminum 4043

Optimum Settings

| | | | | | | | | | | | | |
|---|---|---|---|---|---|---|---|---|---|---|---|---|
| Start Time (seconds) | 0.5 | 0.5 | 0.5 | 0.5 | 0.5 | 0.5 | 0.5 | 0.5 | 0.5 | 0.5 | 0.5 | 0.5 |
| Start Power (%) | 180 | 180 | 180 | 180 | 180 | 160 | 147 | 135 | 128 | 120 | 111 | 100 |
| Start WFS (IPM) | 180 | 234 | 297 | 333 | 378 | 496 | 544 | 608 | 666 | 744 | 799 | 800 |
| Start Length | 40 | 40 | 40 | 50 | 50 | 50 | 50 | 50 | 50 | 50 | 50 | 50 |
| Ramp Length | 40 | 40 | 40 | 50 | 50 | 50 | 50 | 50 | 50 | 50 | 50 | 50 |
| Ramp Time (seconds) | 1 | 1 | 1 | 1 | 1 | 1 | 1 | 1 | 1 | 1 | 1 | 1 |
| Weld WFS (IPM) | 100 | 130 | 165 | 185 | 210 | 310 | 370 | 450 | 520 | 620 | 720 | 800 |
| Maximum user adj. (IPM) | 800 | 800 | 800 | 800 | 800 | 800 | 800 | 800 | 800 | 800 | 800 | 800 |
| Maximum start power adj. (%) | 444 | 342 | 269 | 240 | 212 | 161 | 147 | 132 | 120 | 108 | 100 | 100 |

It is recognized that Table 1 may not include settings for all possible weld wire feed speeds that may be input by a user. In this regard, it is contemplated that the controller can be designed to interpolate values for a weld wire feed speed in which startup settings have not been empirically determined and stored. For example, to determine the optimum settings for a weld wire feed speed of 260 ipm, the controller may interpolate the optimum startup settings from those values corresponding to 210 ipm and 310 ipm. It is contemplated that any of a number of interpolation techniques may be used to calculate the appropriate optimum startup values.

Figure 4:
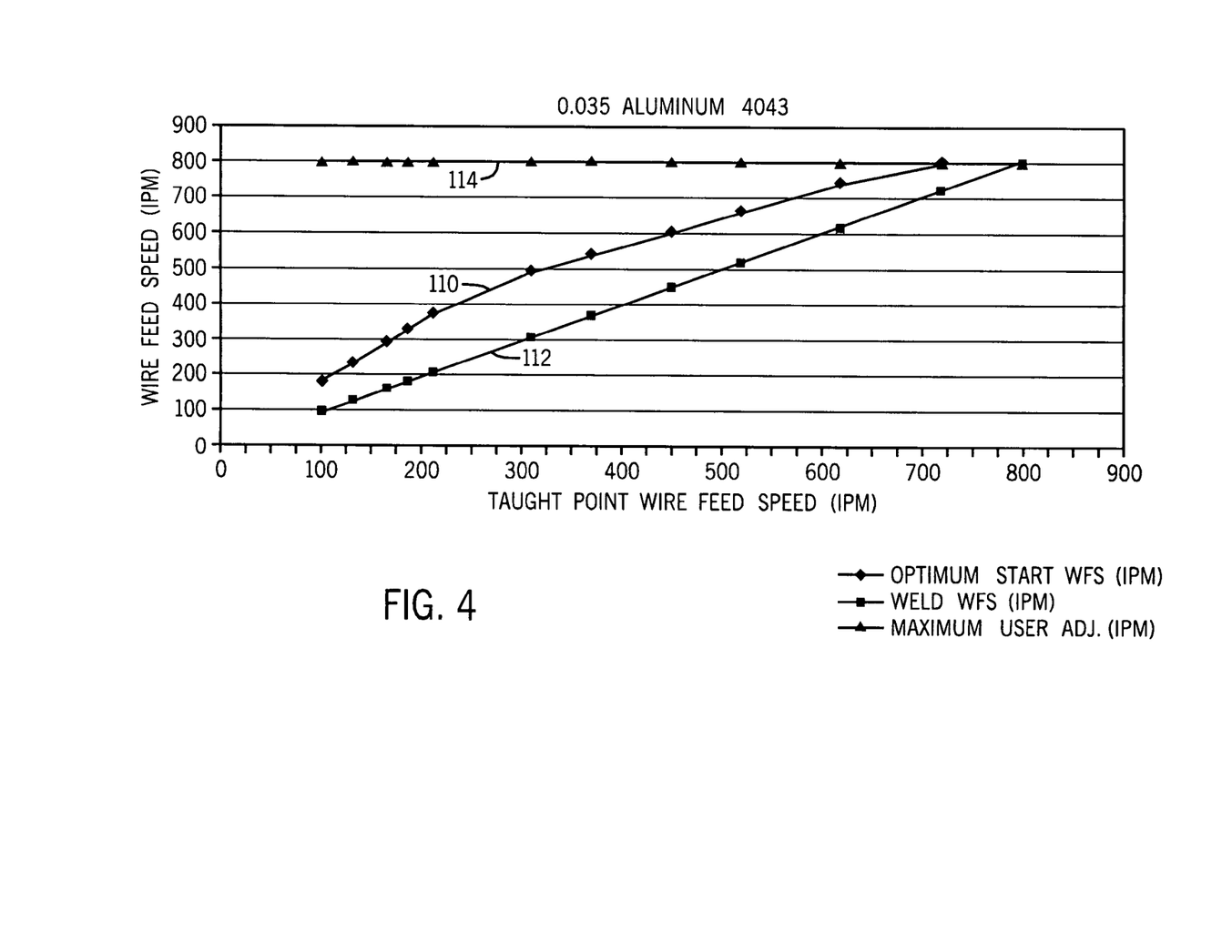
FIG. 4 is a graph illustrating an optimum start wire feed speed curve relative to a weld wire feed speed curve and an exemplary maximum wire feed speed for 0.035 Aluminum 4043 welding wire.
Figure 5:
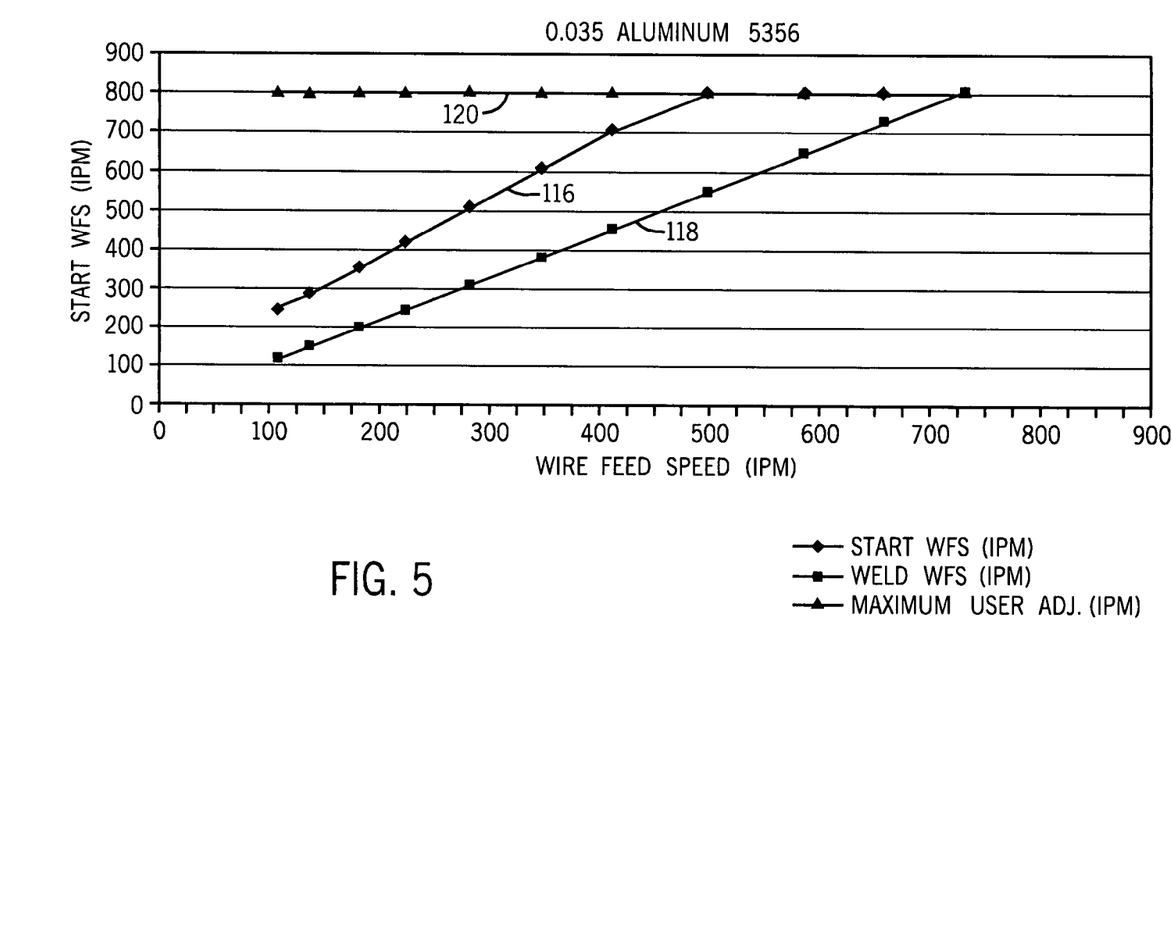
FIG. 5 is a graph illustrating an optimum start wire feed speed curve relative to a weld wire feed speed curve and an exemplary maximum wire feed speed for 0.035 Aluminum 5356 welding wire.

FIG. 5 is a graph that illustrates an optimum startup wire feed speed curve 116 relative to a weld wire feed speed curve 118 and a maximum support wire feed speed curve 120 that have been empirically determined for GMAW-P of 0.035 Aluminum 5356. FIG. 5 is similar to FIG. 4 and shows the relationship between the empirically determined optimum startup wire feed speed for various weld wire feed speeds for welding of 0.035 Aluminum 5356 using GMAW-P. Table 2 provides data values of a look-up table or data map for various startup settings that correspond to the optimum startup wire feed speeds for various weld wire feed speeds.

TABLE 2

0.035 Aluminum 5356

Optimum Settings

| | | | | | | | | | | | |
|---|---|---|---|---|---|---|---|---|---|---|---|
| Start Time (seconds) | 0.5 | 0.5 | 0.5 | 0.5 | 0.5 | 0.5 | 0.5 | 0.5 | 0.5 | 0.5 | 0.5 |
| Start Power (%) | 202 | 190 | 177 | 170 | 164 | 159 | 156 | 146 | 125 | 111 | 100 |
| Start WFS (IPM) | 242 | 285 | 354 | 417 | 508 | 604 | 702 | 796 | 800 | 799 | 800 |
| Start Length | 60 | 60 | 60 | 60 | 60 | 60 | 60 | 60 | 60 | 60 | 60 |
| Ramp Length | 60 | 60 | 60 | 60 | 60 | 60 | 60 | 60 | 60 | 60 | 60 |
| Ramp Time (seconds) | 1 | 1 | 1 | 1 | 1 | 1 | 1 | 1 | 1 | 1 | 1 |
| Weld WFS (IPM) | 120 | 150 | 200 | 245 | 310 | 380 | 450 | 545 | 640 | 720 | 800 |
| Maximum user adj. (IPM) | 800 | 800 | 800 | 800 | 800 | 800 | 800 | 800 | 800 | 800 | 800 |
| Maximum start power adj. (%) | 330 | 281 | 226 | 192 | 157 | 132 | 114 | 101 | 100 | 100 | 100 |

Figure 6:
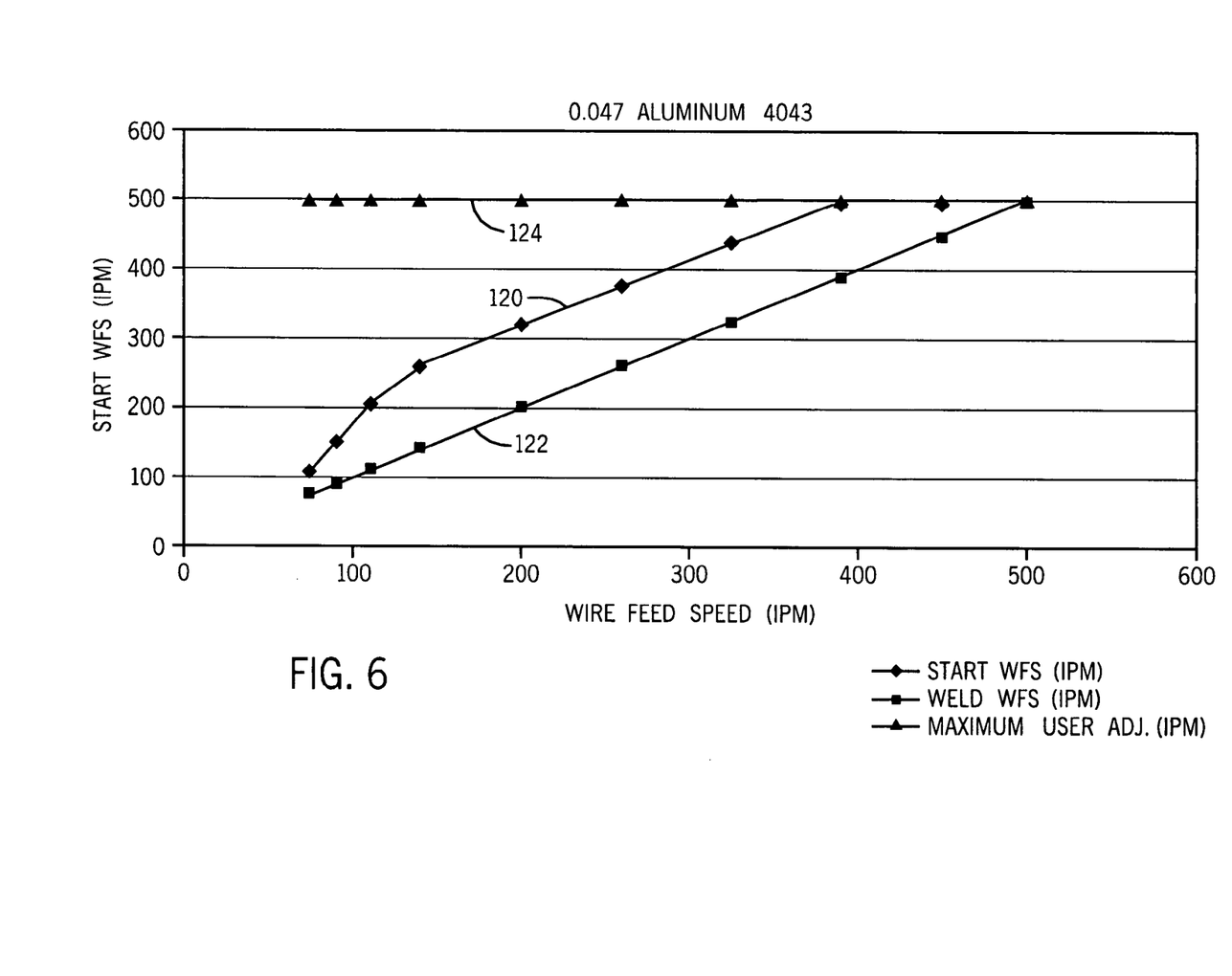
FIG. 6 is a graph illustrating an optimum start wire feed speed curve relative to a weld wire feed speed curve and an exemplary maximum wire feed speed for 0.047 Aluminum 4043 welding wire.

FIG. 6 is a graph that illustrates an optimum startup wire feed speed curve 120 relative to a weld wire feed speed curve 122 and a maximum support wire feed speed curve 124 that have been empirically determined for GMAW-P of 0.047 Aluminum 4043. FIG. 6 is similar to FIGS. 4 and 5, and shows the relationship between the empirically determined optimum startup wire feed speed for various weld wire feed speeds for welding of 0.047 Aluminum 4043 using GMAW-P. Table 3 provides data values of a look-up table or data map for various startup settings that correspond to the optimum startup wire feed speeds for various weld wire feed speeds.

TABLE 3

0.047 Aluminum 4043

Optimum Settings

| | | | | | | | | | | |
|---|---|---|---|---|---|---|---|---|---|---|
| Start Time (seconds) | 0.5 | 0.5 | 0.5 | 0.5 | 0.5 | 0.5 | 0.5 | 0.5 | 0.5 | 0.5 |
| Start Power (%) | 140 | 163 | 184 | 185 | 160 | 146 | 136 | 128 | 111 | 100 |
| Start WFS (IPM) | 105 | 147 | 202 | 259 | 320 | 380 | 442 | 499 | 500 | 500 |
| Start Length | 70 | 70 | 60 | 60 | 60 | 60 | 60 | 60 | 60 | 60 |
| Ramp Length | 70 | 70 | 60 | 60 | 60 | 60 | 60 | 60 | 60 | 60 |
| Ramp Time (seconds) | 1 | 1 | 1 | 1 | 1 | 1 | 1 | 1 | 1 | 1 |
| Weld WFS (IPM) | 75 | 90 | 110 | 140 | 200 | 260 | 325 | 390 | 450 | 500 |
| Maximum user adj. (IPM) | 500 | 500 | 500 | 500 | 500 | 500 | 500 | 500 | 500 | 500 |
| Maximum start power adj. (%) | 476 | 341 | 247 | 193 | 156 | 132 | 113 | 100 | 100 | 100 |

Therefore, the present invention includes a welding-type device having a controller. The controller is configured to receive an input value for a welding-type parameter, the welding-type parameter designed to establish an operational welding-type process, and determine an offset value of the input value for the welding-type parameter. The offset value is designed to establish an operation of the welding-type process during a startup period of the welding-type process. The controller is also configured to enable user selection between the input value and the offset value for the welding-type parameter during the startup period of the welding-type process.

The present invention further includes a method of fusing aluminum to a workpiece. The method includes the steps of receiving an input for desired weld wire feed speed and determining an optimum startup wire feed speed from the desired weld wire feed speed. The method further includes initiating the welding process at the optimum wire feed speed for a startup time period and continuing the welding process at the desired weld wire feed speed after expiration of the startup time period.

The present invention also includes a controller for a welding-type system. The controller is configured to determine a first set of operating parameters designed to govern a welding-type process after initialization period and determine a second set of operating parameters designed to govern the welding-type process during the initialization period based on the first set of operating parameters. The controller is further configured to carry out the welding-type process such that the second set of operating parameters governs the welding-type process during the initialization period and the first set of operating parameters governs the welding-type process after the initialization period.

The present invention has been described in terms of the preferred embodiment, and it is recognized that equivalents, alternatives, and modifications, aside from those expressly stated, are possible and within the scope of the appending claims.

What is claimed is:

1. A system comprising:
a power source configured to supply power to establish an operation of a welding-type process; and
a controller configured to:
determine a first set of operating parameters related to wire feed speed to govern a welding-type process after an initialization period;
automatically determine a second set of operating parameters related to wire feed speed to govern the welding-type process during the initialization period based on the first set of operating parameters; and
selectively control the welding-type process such that a selection between the first set of operating parameters and the second set of operating parameters governs the welding-type process during the initialization period and the first set of operating parameters governs the welding-type process after the initialization period.

2. The system of claim 1, wherein the first set of operating parameters includes a target wire feed speed and the second set of operating parameters includes a startup wire feed speed.

3. The system of claim 2, wherein the controller is configured to set the startup wire feed speed to a value that exceeds that of the target wire feed speed.

4. The system of claim 3, wherein the controller is configured to ramp an actual wire feed speed during the initialization period from the startup wire feed speed to the target wire feed speed.

5. The system of claim 4, wherein the controller is configured to ramp linearly from the startup wire feed speed to the target wire feed speed during the initialization period.

6. The system of claim 1, wherein the controller is configured to allow an override of the second set of operating parameters to define an adjusted second set of operating parameters to govern the welding-type process during the initialization period.

7. The system of claim 1, wherein the controller is configured to determine the second set of operating parameters such that more heat is generated at a weld during the initialization period of the welding-type process.

8. The system of claim 1, wherein the welding-type process includes welding aluminum with a workpiece.

9. The system of claim 1, wherein the controller is disposed in the power source.

10. A system comprising:
a power source configured to supply power to establish an operation of a welding-type process; and a controller configured to:
receive an input value for a welding-type parameter related to wire feed speed;
automatically determine an offset value to the input value for the welding-type parameter; and
control the welding-type process based on a selection between the offset value and the input value during a startup period of the welding-type process.

11. The system of claim 10, wherein the offset value corresponds to an optimum wire feed speed for the startup period of the welding-type process.

12. The system of claim 10, wherein the controller is configured to control operation of a wire feeder such that wire feed speed is ramped from the offset value to the input value during the startup period when the selection is the offset value.

13. The system of claim 10, wherein the startup period of the welding-type process includes a 0.5 second initialization period followed by a 1.0 second ramping period.

14. The system of claim 10, wherein the controller is configured to control the power source such that more power is output by the power source during the startup period of the welding-type process than after the startup period when the selection is the offset value.

15. The system of claim 14, wherein the controller is configured to control the power source such that heat generated at a workpiece during the startup period of the welding-type process exceeds the heat generated after the startup period.

16. The system of claim 10, wherein the welding-type process includes welding aluminum with a workpiece.

17. The system of claim 10, wherein the offset value is greater than the input value.

18. The system of claim 10, wherein the controller is configured to adjust the offset value to a preferred offset value and control the welding-type process such that the preferred offset value governs operation of the welding-type process during the startup period of the welding-type process.

19. The system of claim 10, wherein the controller is configured to limit adjustment of the offset value to a preferred offset value not less than the input value.

20. The system of claim 10, wherein the controller is disposed in the power source.

* * * * *